United States Patent [19]

McKee

[11] 4,015,839
[45] Apr. 5, 1977

[54] CARD FEEDING STATION

[75] Inventor: James W. McKee, Mission Viejo, Calif.

[73] Assignee: True Data Corporation, Santa Ana, Calif.

[22] Filed: Nov. 11, 1974

[21] Appl. No.: 522,735

Related U.S. Application Data

[62] Division of Ser. No. 198,722, Nov. 15, 1971, Pat. No. 3,847,382.

[52] U.S. Cl. .................................. 271/37; 271/118; 271/165; 271/275
[51] Int. Cl.² ........................ B65H 3/06; B65H 3/34
[58] Field of Search ........... 271/10, 118, 117, 146, 271/165, 37, 35, 275, 124

[56] References Cited

UNITED STATES PATENTS

| 596,098 | 12/1897 | Whitehead | 271/118 X |
|---|---|---|---|
| 1,457,158 | 5/1923 | Gammeter | 271/35 |
| 1,637,833 | 8/1927 | Mueller | 271/124 |
| 2,363,357 | 11/1944 | Post | 271/118 |
| 3,532,423 | 10/1970 | Bruning et al. | 271/117 X |
| 3,545,741 | 12/1970 | Porth | 271/146 X |
| 3,561,755 | 2/1971 | Brue | 271/118 |

Primary Examiner—Evon C. Blunk
Assistant Examiner—Bruce H. Stoner, Jr.
Attorney, Agent, or Firm—Newton H. Lee, Jr.

[57] ABSTRACT

A data card feeding station in which a stack of cards is aligned and removed one-by-one from the stack by a feed roll and a pressure applying spring under the control of a card engaging plate which is actuated on command to allow engagement of a card between the feed roll and the spring.

7 Claims, 9 Drawing Figures

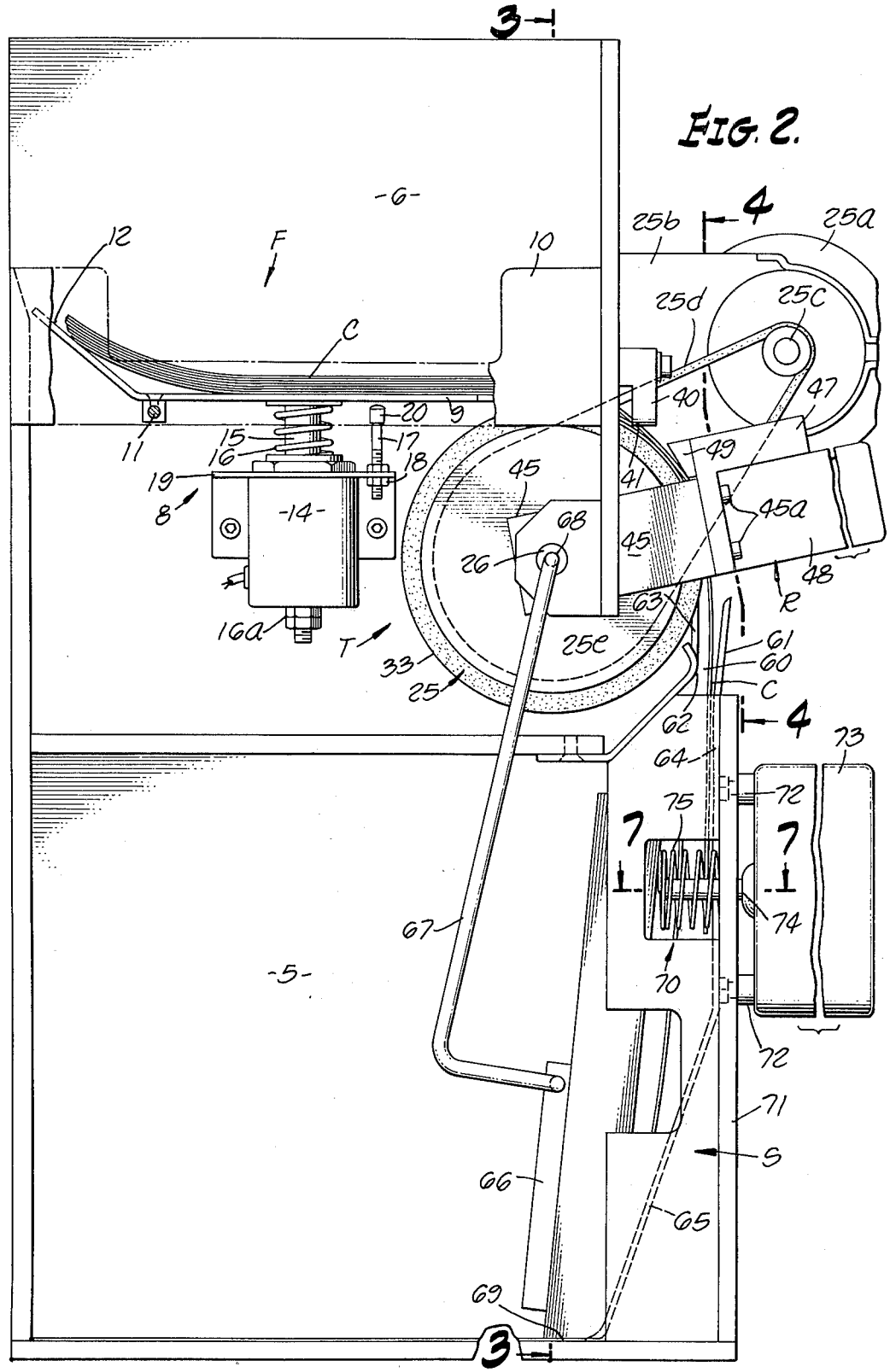

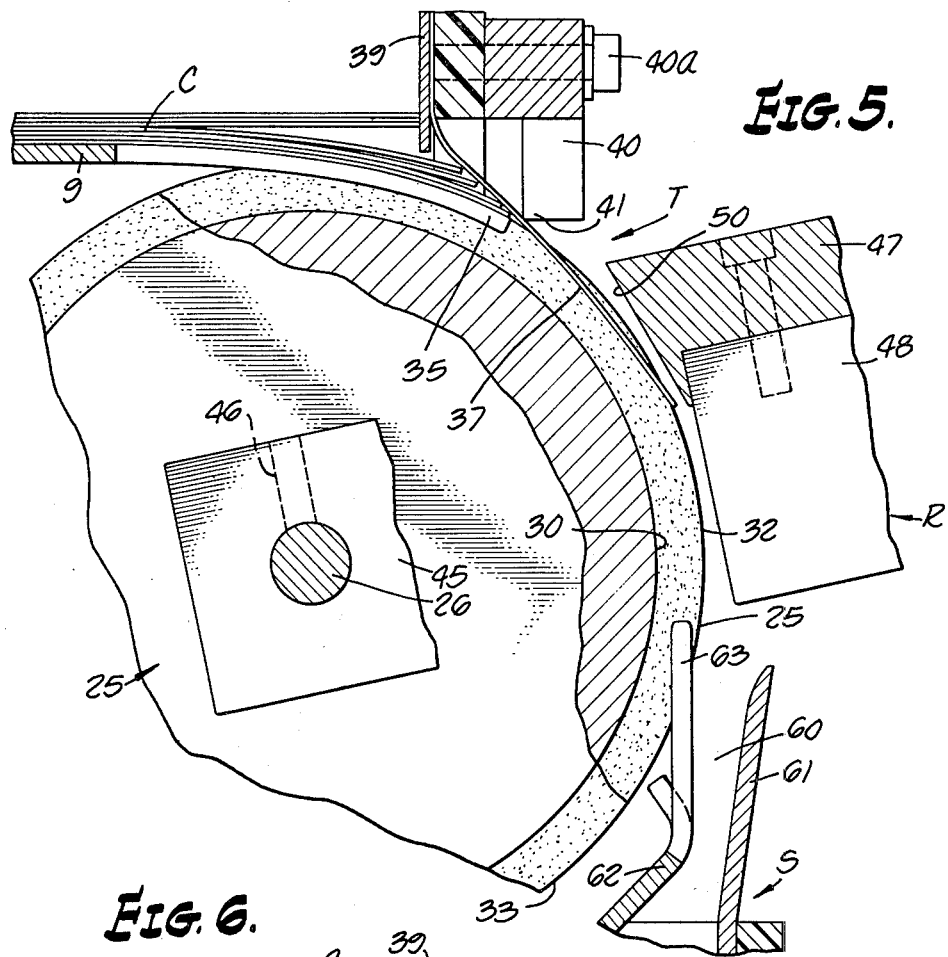
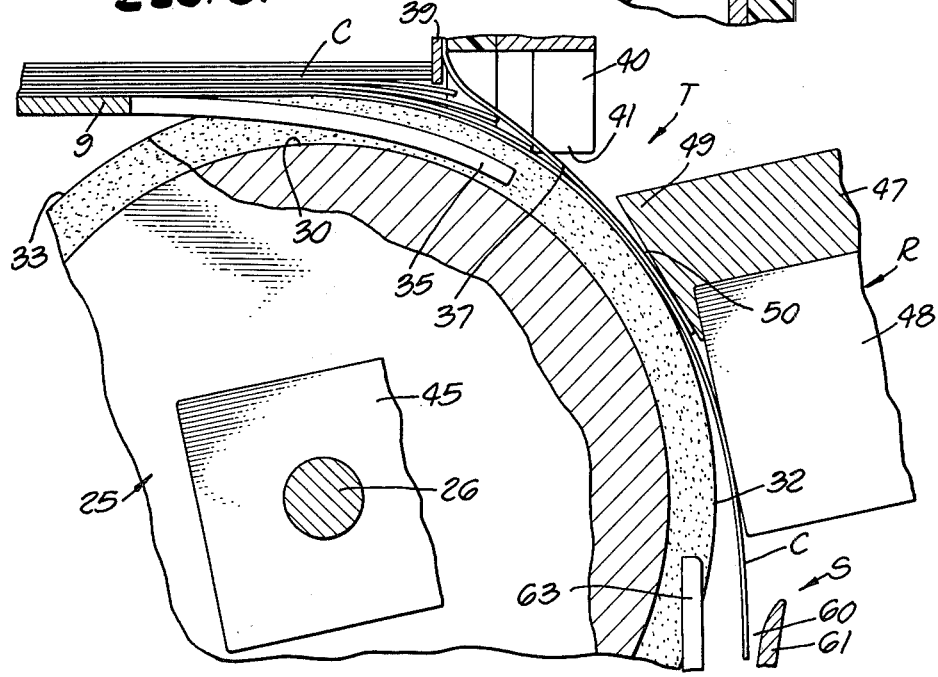

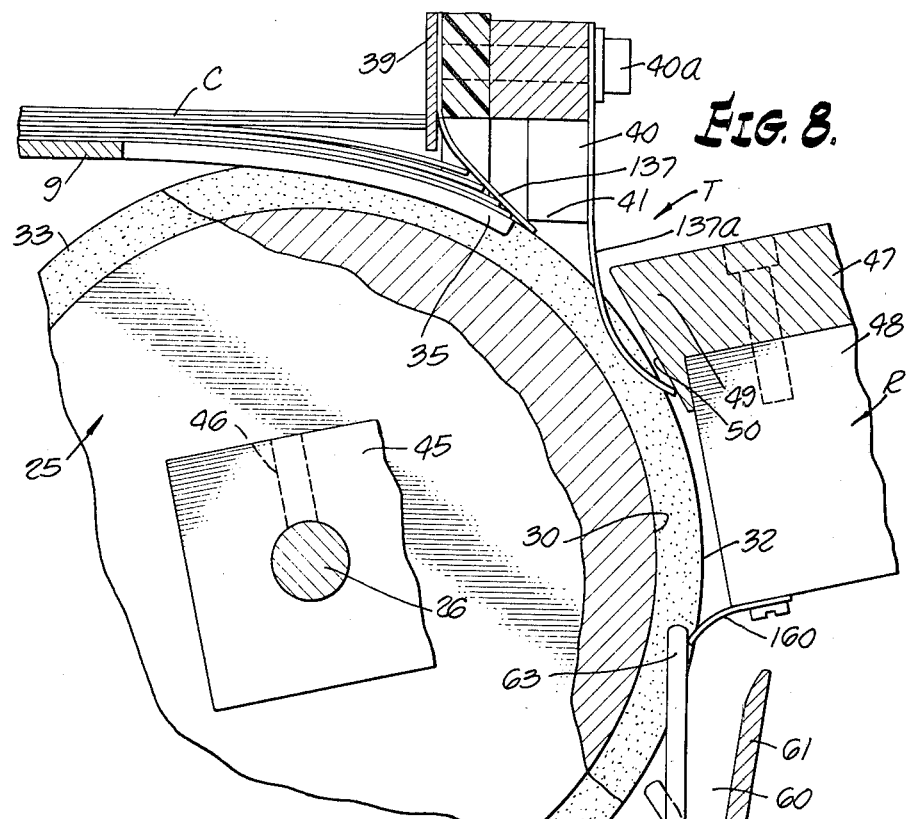
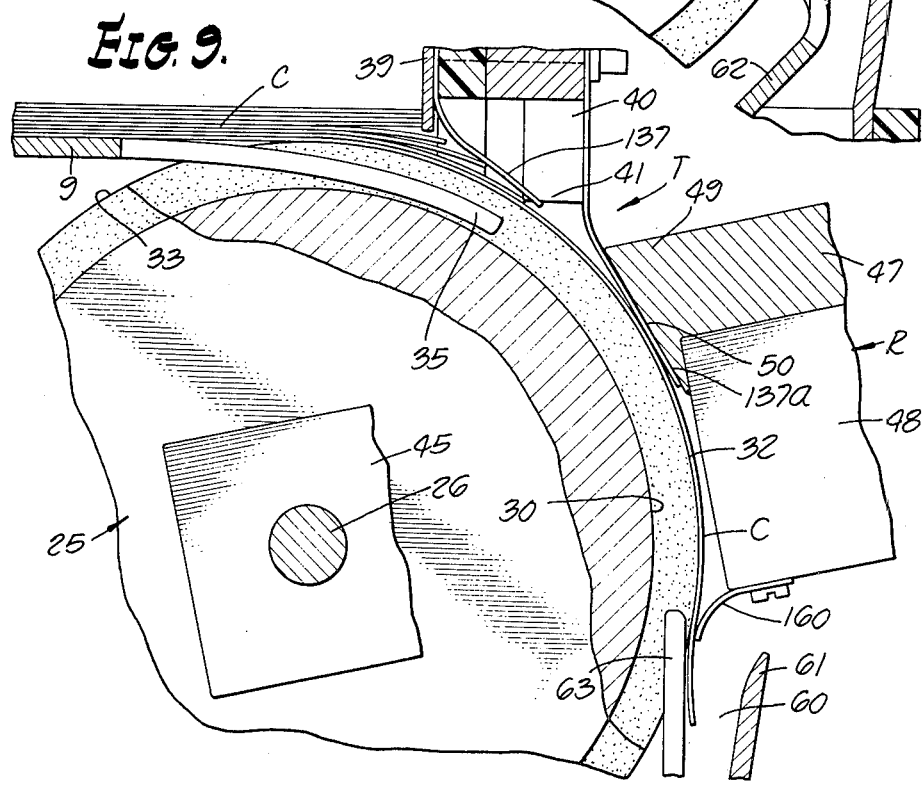

CARD FEEDING STATION

CROSS REFERENCE TO RELATED APPLICATION

This application is a division of my pending application Ser. No. 198,722, filed Nov. 15, 1971, now U.S. Pat. No. 3,847,382 granted Nov. 12, 1974.

BACKGROUND OF THE INVENTION

Various card handling devices have heretofore been provided for successively feeding cards, such as data cards, containing data in the form of perforations or printed indicia arranged in laterally spaced rows extending along the card or check, past a reading station at which the data, or the perforations or indicia representative of the data, are scanned by a reader head to transmit the information or data to a computer for storage or conversion to legible data.

Problems have been encountered in the apparatus in respect of establishing and maintaining alignment of the card with the reading station within acceptable limits to avoid erroneous readings or machine stoppage when excessive mis-alignment occurs. Among other things, alignment problems reduce the effective reading rate of the apparatus, because of the necessity, in many cases, to operate at low feed rates and because of frequent stoppage. These problems have persisted, notwithstanding the advent of expensive and complicated apparatus, including, for example, vacuum type feed rollers. Such prior machines, moreover, experience difficulty in the proper handling of cards which have been folded, bent, spindled, or otherwise mutilated, for example, by torn edges.

Regarding reading accuracy or inaccuracy caused by misalignment, conventional data card, including check, handling apparatus provides a feeding station to which the cards are supplied in stacks, the cards being fed successively from the bottom of the stack. The alignment of the cards with the reading head at the reading station is accomplished by guides spaced apart to provide limited tolerance for the opposite longitudinal edges of the cards. The feeding of the cards is accomplished by spaced capstans or rollers which engage the cards as they travel to and past the reading station. The cards, however, are capable of skewing in their path of travel, that is, to move angularly within the guides about an axis perpendicular to the path of travel. Moreover, the cards are unrestrained except at the points of contact with the feed rollers or capstans and are, therefore, free to flutter, that is, to partake of an undulating motion or transverse flexure. When the cards in such apparatus are engaged between a spaced pair of capstans or rollers, the unavoidable and inherent differential peripheral speeds of the capstans or rollers, caused by dimensional differences in the rollers themselves and in the drive therefor, causes longitudinal buckling of the cards.

All of these alignment problems which can cause erroneous reading or machine stoppage can occur at the critical point, where uniformity of alignment and speed is most needed, namely, at the reading station.

When the cards leave the reading station, they are successively fed to a receiver. If a preceding card is in the path of a following card, the following card may contact the card in front of it and as a result be caused to be slightly retarded, causing stoppage of the conventional apparatus which generally includes sensing means for detecting slight longitudinal shifting of the card during the period that it is being read, to avoid erroneous readout. While auger type shifting devices have been employed in an effort to positively move the preceding card from the path of the following card, such auger type devices are only partially effective since the cards may be deterred in their travel by impingement upon the crest of the helical rib of the auger, thus causing stoppage of the apparatus and potential edge damage to the card.

SUMMARY OF THE INVENTION

The present invention provides card handling apparatus which obviates the above referred to problems and deficiencies in the prior card handling apparatus.

More particularly, the present invention provides novel card handling apparatus for feeding data cards past a reading station, wherein the cards are initially successively aligned properly with the readout head and are delivered to a transport mechanism while in such alignment, and held positively in alignment as the cards are successively transported past the reading station. The transporting mechanism is such that skewing flutter and longitudinal deformation of the cards are all prevented. In addition, the transport mechanism is so constructed that bent or crumpled cards, as well as damaged cards, are picked up and transported past the reading station in a flattened state so as to be accurately read and to thereby avoid machine stoppage. Further, the apparatus provides auger means for moving a preceding card from the path of a following card at the receiving station to avoid impingement by the following card, wherein the auger is resilient and offers no immovable obstruction to a card to cause the stoppage of machine operation and/or edge mutilation of the card.

In accomplishing the foregoing, the invention provides a feeding station having a card guiding or aligning surface disposed at an incline along an edge of the stack of cards, and the stack of cards is jostled or agitated to cause the cards to gravitate into contact with the card aligning surface to a position parallel with the direction of card travel when the cards are successively picked up at the feeding station by the transport mechanism.

The transport mechanism which transports cards from the feed station, past the reading station to the receiving station, in accordance with the invention, employs a single feed roll against which the cards are pressed to hold the cards against lateral or longitudinal shifting relative to the feed roller. Such pressing of the card against the feed roller is also present at the reading station, where immobility of the card from proper alignment or slippage of the card with respect to the feed roller would otherwise cause error or stoppage. Pressing of the card against the transport roller at the reading station will also flatten crumpled or bent cards at the critical point to enable such cards to be accurately read. Since only a single feed roll is used in the transport, the usual timing disc can revolve with the roll and accurately represent card motion, whereas such a timing disc on one of the capstans of a dual capstan transport mechanism is inaccurate since it merely represents motion at a single capstan which may differ from total card motion.

In a specific form, the jostling of the stack of cards in the feeding station to uniformly align the cards with the reading head, is accomplished by a mechanism which also operates to cause the leading edge of successive cards to be pressed against the transport roller when activated.

When the successive cards pass the reading station and enter the receiving station or stacker for removal from the apparatus, they are removed from the path of the on-coming card by resilient screw or auger devices composed of an open spiral of spring wire. Thus, the on-coming card will not contact the preceding card, nor will the leading edge of the successive cards be torn or mutilated, since the spring spiral will resiliently deflect sufficiently to avoid such damage.

The invention possesses other features and has other advantages which will be best understood from the following detailed description, taken together with the accompanying drawings forming a part of the application; but it is to be understood that the description and drawings are not to be taken in a limiting sense, since the invention may take other forms and is best defined in the appended claims.

BRIEF DESCRIPTION OF THE DRAWINGS

FIG. 2 is a section, as taken on the line 2—2 of FIG. 1, showing the interior apparatus;

FIG. 5 is an enlarged fragmentary section, as taken on the line 5—5 of FIG. 3, showing the card transport mechanism conditioned to pick up and start movement of a card towards the reading station;

FIG. 6 is a view corresponding to FIG. 5, but showing the card passing the reading station;

FIG. 8 is a view corresponding to FIG. 5, but showing a modified construction; and FIG. 9 is a view corresponding to FIG. 6, but showing the modified construction of FIG. 6.

DESCRIPTION OF THE PREFERRED EMBODIMENTS

Figure 1:
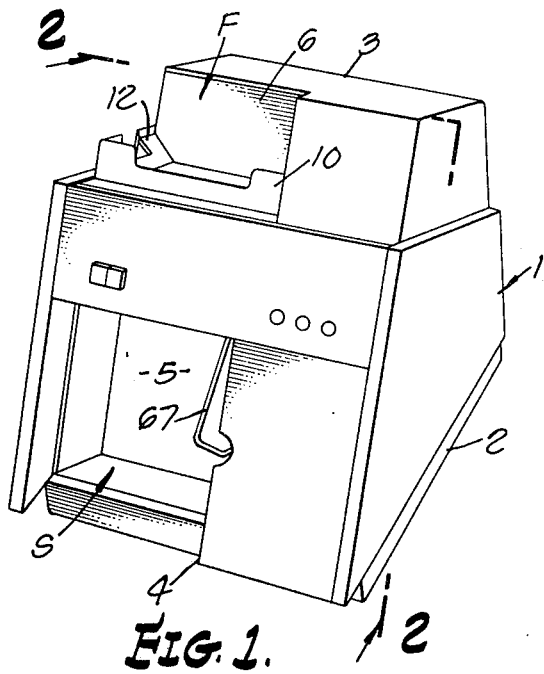
FIG. 1 is a predominantly frontal perspective of card handling apparatus made in accordance with the invention.

As seen in the drawings, the apparatus of the invention is incorporated in a case or housing 1 having a base 2 adapted to rest on a suitable support, such as a table or other support, and having an upper section 3 in which is a feeding station F to which a stack of data cards, such as punched cards, checks or the like are to be supplied, the housing also having a lower section 4 in which is a card receiver or stacking station S, to which cards are transported by transport means T past a reading station R. The details of the housing 1 require no specific illustration, but it will be understood that it is so constructed as to enable access to the interior working mechanisms described below.

Figure 3:
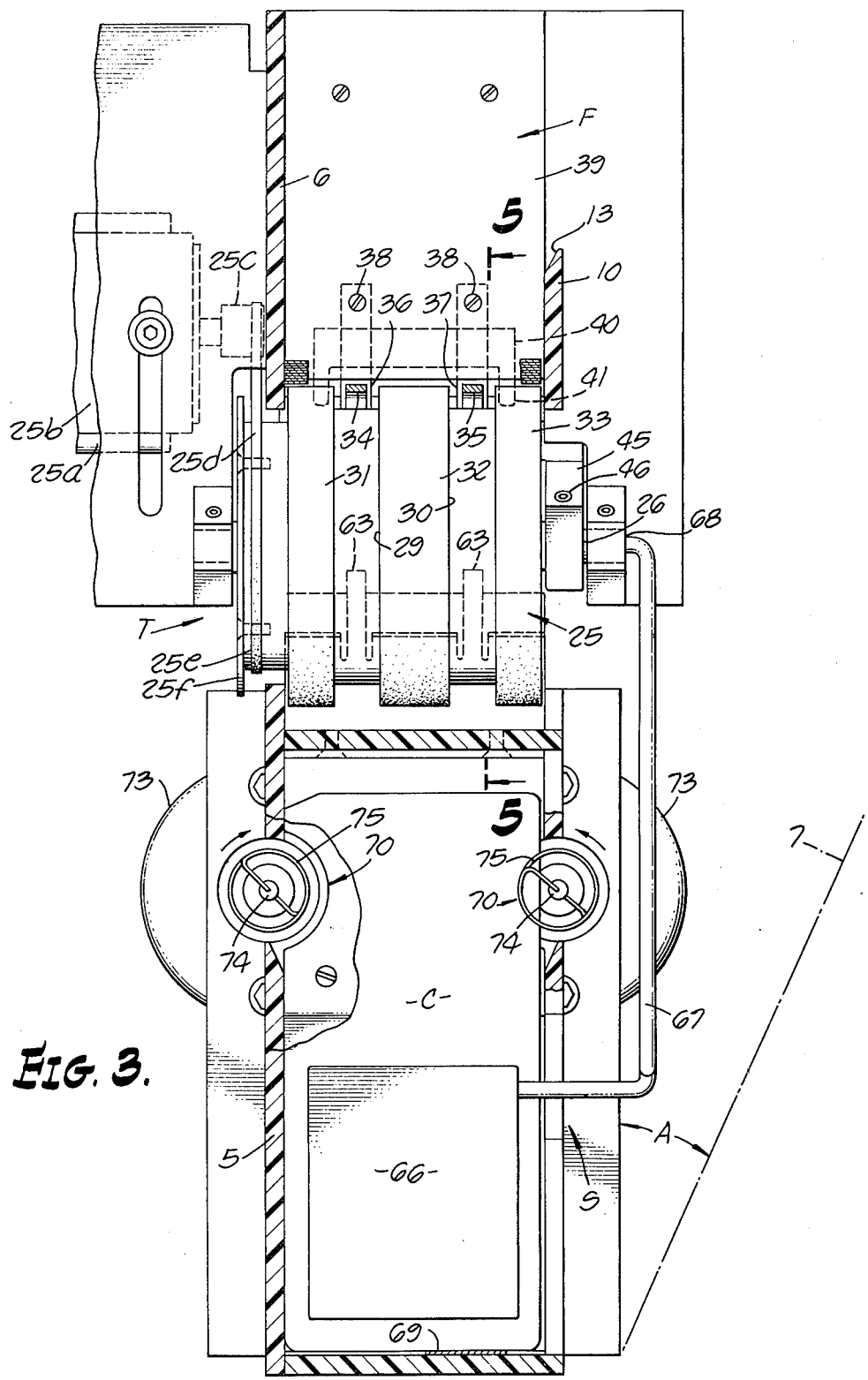
FIG. 3 is a section as taken on the line 3—3 of FIG. 2.

The housing has an inner wall 5 which extends upwardly from the base in the stacking station S and a wall portion 6 forming the back of the feed station F, these walls, as best seen in FIGS. 1 and 3, being inclined relative to a vertical plane denoted by the line 7 in FIG. 3, at an angle which facilitates movement of the cards, particularly in the feed station F, laterally into edge engagement with the wall 6. In practice, this angle A may be on the order of 25° from vertical and, if desired, the wall 6 may be substantially horizontal.

The feed station F includes means 8 for agitating or jostling a stack of cards C which are placed in the feed station in generally horizontal relation. The jostling means 8 includes a plate 9 which is generally horizontally deposed between the inner wall 6 and an outer wall 10, the plate being mounted on pivot means 11 remote from the transport station T. The plate 9 has an upwardly inclined end section 12 so that a stack of cards C inherently tends to slide toward the transport station T in stepped or feathered relation in a direction longitudinally of the plate 9, the lower most card being positioned with a leading edge closer to the transport means T than the cards thereabove. The stack of cards also inherently tends to shift laterally into longitudinal edge contact with the inner wall 6, as seen in FIG. 3, due to the fact that the plate 9 is laterally inclined relative to a horizontal plane. As shown, the axis of the pivot means 11 is normal to the wall 6, and therefore, if the wall 6 is at an angle of 25° relative to the vertical plane 7, the plate 9 will be at an angle of 25° relative to a horizontal plane. At its upper edge, the wall 10 has a bevelled surface 13 tending to cause cards to move toward the wall 6 when a stack of cards C has a height greater than the front wall 10 and any of the cards laterally project from the pack towards the wall 10, a distance greater than the small clearance between the cards and the walls 6 and 10. In the event that the guide wall 6 is disposed at an angle nearing horizontal, say between horizontal and about 45° from horizontal, means may be employed to urge the stack of cards against the plate 9. Indeed, even when the guide wall 6 is at an angle as illustrated, means may be needed to apply downward pressure on the stack, particularly when there are few cards in the stack.

In the illustrated embodiment, the agitating or jostling means 8, comprises a solenoid 14, the armature 15 of which is suitably connected beneath the plate 9. A coiled spring 16 disposed about the armature 15 normally biases the plate 9 to pivot upwardly about the pivot means 11, limited by suitable stop means 16a on the lower end of the armature 15, in the illustrated form of a stop nut. Downward movement of the plate 9 is limited by the solenoid stroke or by a stop pin 17 suitably connected by nuts at 18 to a solenoid support bracket 19, a resilient bumper 20 being provided on the pin 17 to engage the plate 9. As will be more fully described below, the solenoid 14 is energized to cause downward movement of the plate 9 against the stop 17 and then de-energized so that the spring 16 returns the plate 9 to the upper position. Such oscillation of the plate 9 beneath the stack of cards C sufficiently agitates or jostles the cards that they are effectively caused to slide laterally down the laterally inclined plate 9 into longitudinal edge contact with the wall 6 at the feeder station. Thus, each card, as the stacked cards are successively moved from beneath the stack by the transport means, is in the same longitudinally aligned relationship to the transport means T and the reading station R.

The transport means T comprises a friction roll 25 rotatably carried by a shaft 26 for rotation on an axis transverse of the feed station and on the same plane as the plate 9. When the apparatus is in operation, the roll 25 is continuously rotated by a drive motor 25a carried by a motor support 25b. A drive pulley 25c on the motor drives a belt 25d which drives a pulley 25e on the roll 25. The friction roll 25 has a resilient cover provided with laterally spaced peripheral grooves 29 and 30 and lands 31, 32 and 33, and means under the control of the oscillation of the plate 9 are provided for causing frictional engagement between the leading edge of the lowermost card and the lands 31–33 on the roll upon each downward movement of the plate 9, so that the lowermost card is picked up at the feeding station and transported past the reading station R to the stacking station S.

More specifically, the end of the plate 9 adjacent to the roll 25 has a pair of laterally spaced extension fingers 34 and 35 extending into the roll grooves 29 and 30 substantially tangentially to the lands 31–33, the cards being supported on the upper surfaces of these fingers when the plate 9 is in the upper position (FIG. 5) and the lower card contacting the friction roll 25 when the plate 9 is moved downwardly (FIG. 6) so that the fingers 34 and 35 are moved radially inwardly in the grooves 29 and 30.

Means are provided to apply pressure to the lowermost card in the stack when the plate 9 and the fingers 34 and 35 are moved downwardly, so that the lowermost card will frictionally engage the lands 31–33 of the roll 25 and thereby be carried by the roll to the reading station R. In the embodiment of FIGS. 1–6, the pressure applying means comprises spring means including a pair of laterally spaced leaf spring arms 36 and 37 affixed by fasteners 38 to an end wall 39 at the feed station F and projecting downwardly in the planes of the roll grooves 29 and 30 and towards the reading station R. These springs 36 and 37 are engageable with the leading edge of the lowermost card when the plate 9 moves downwardly to press the leading edge against the roll 25, but when the plate is in its upper position, the plate fingers 34 and 35 engage beneath the springs 36 and 37 (FIG. 5) to hold the springs out of pressure contact with the lowermost card. The springs 36 and 37 extend circumferentially of the roll 25 sufficiently towards the reading station R, that as the lowermost card is carried by the roll 25 towards and past the reading station, the card is held in the same precise alignment, with respect to the roll 25 and the reading station R, which was established by edge contact of the card with the wall 6 at the feed station. Thus, inaccuracy in reading the card due to misalignment is avoided. Moreover, the springs 36 and 37 press the card smoothly against the lands 31–33 and no fluttering of the card is possible. Since only one roll is in engagement with the card, moreover, no undesired longitudinal deformation of the card can occur. As a consequence, the transport mechanism can efficiently carry cards past the reading station R which have been mutilated or crumpled, so that such cards can be effectively read, without jamming or being torn in the transport mechanism and without causing machine stoppage. A timing disc 25f is carried by the roll 25. Such discs, as is well known, are transparent, but have circumferentially spaced opaque markings revolvable relative to fixed opaque markings and a light source (not shown) to time the reader with card motion. Since the cards are fed by a single roll 25 and slippage cannot occur, due to the springs 37 forcing the cards into positive frictional drive relation with the roll 25, the timing is more accurate than in machines where flutter and longitudinal deformation of the card are inherent.

To position successive cards at the feed station and avoid the simultaneous picking up of more than one card by the roll 25 when the solenoid 14 is actuated, which might occur by reason of burrs or tears in adjacent cards or interfacial card friction, a gauge bar 40 is mounted by fasteners 40a on the end wall 39, the gauge bar 40 having depending stop fingers 41 spaced from the periphery of the lands 31–33 sufficiently to enable passage of a single card past the fingers 41, but the superjacent card will engage the fingers 41 and be held against movement until the trailing edge of the lowermost card clears the leading edge of the superjacent card and solenoid 14 is again actuated.

At the reading station R, is a support arm 45, clamped or otherwise mounted on the roll support shaft 26 by set screws 46. Mounted on the support arm 45 by fasteners 45a is a reading head supporting bracket 47 which carried a conventional reading head 48 by which the successive cards fed through the feed station are scanned. The details of the reader head are not germane to the present invention, but in any event the reader head detects and supplies signals to a data storing or printing apparatus representing the data recorded on the card. Adjacent to the roll 25, the bracket 47 has a portion 49 opposed to the periphery of the roll 25 and having a face 50 against which the leaf springs 36, 37 abut at their free ends, so that the springs 36, 37 exert substantial pressure on a card pressing the card positively into frictional engagement with the roll 25 as the mid-section of the springs 37 are flexed outwardly from the grooves 29 and 30 of the roll 25 by a card approaching the reading station R, as seen in FIG. 6.

As the cards successively pass through the reading station R, they move downwardly to the stacking station S through a throat 60 defined between an outer guide 61 and an inner guide 62 having stripper fingers 63 which extend into grooves 29 and 30 in the feed roll 25 to prevent the cards from clinging to the roll and deflect the leading edges of the cards into the throat 60. The guide 61 is at the upper end of a plate 64 which, at its lower portion 65, is inclined inwardly to decelerate and deflect the lower end of the cards as they move downwardly to form a stack of cards standing on edge, as seen in FIG. 2. A retainer 66 pivotally carried on the free end of an arm 67 pivotally supported at 68 retains the edge stacked cards against sliding to horizontal positions so that the cards are stacked edgewise in the same order at the stacking station S as the cards are transported from the feed station F.

Figure 7:
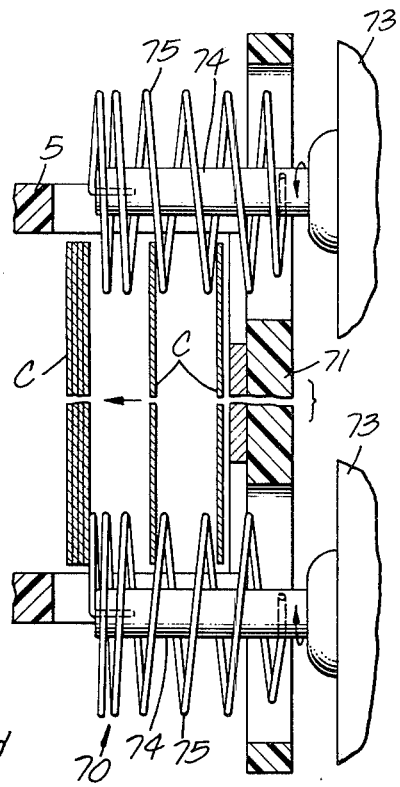
FIG. 7 is an enlarged horizontal section, as taken on the line 7—7 of FIG. 2.
Figure 4:
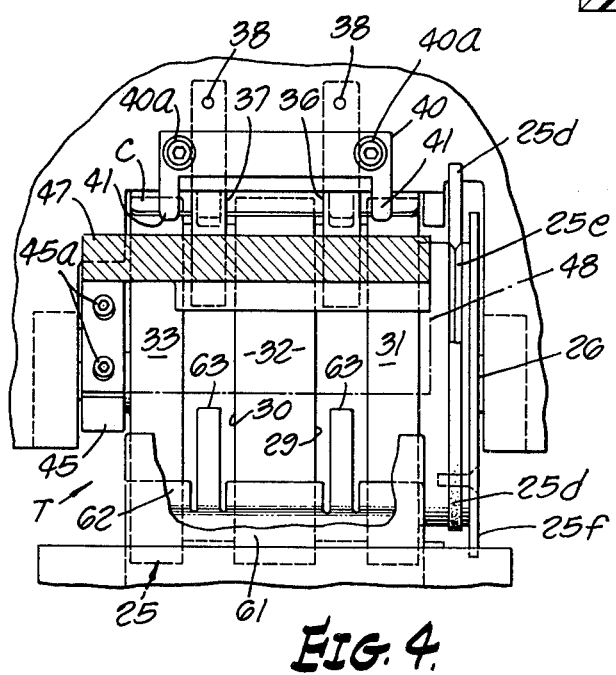
FIG. 4 is a fragmentary section as taken on the line 4—4 of FIG. 2.

Means are provided at the stacking station for moving the successive cards from the path of an on-coming card, as best seen in FIGS. 2, 3, and 7, so that an on-coming card cannot impinge upon a preceding card and cause mutilation of either card. As is apparent in FIG. 2, the preceding card will engage the bottom 69 of the stacker station while an on-coming card is still being positively driven by the transport roll 25. While the drive friction between the card and the roll 25 is sufficient to prevent slippage, so that slippage is no problem, in accordance with the invention, it is necessary to prevent impingement of the card being transported against anything which can cause card damage. Thus, the means for moving the successive cards from the path of an on-coming card comprises resilient rotary screw means 70.

More particularly, a vertical wall 71 at the stacking station T, beneath the reading station R, supports, on mounts 72, drive means, here shown, as a pair of electric motors 73, 73, the shafts 74 of which extend through openings in the support wall 71, and are laterally spaced a distance greater than the width of a card C which passes from the throat 60 between the shafts 74. Suitably mounted on the shafts 74 for rotation therewith are helically wound, resilient screws or auger devices 75, having a lead longitudinally of the shafts 74. In the illustrative embodiment, the spring screws are of opposite hand and are, therefore, rotated oppositely, as indicated by the arrows in FIG. 7. The spring screws project laterally towards one another so that a card C moving downwardly between the shafts 74 will be engaged at its opposite longitudinal edges and moved progressively to the left in FIG. 7, as indicated by the arrow, so that the trailing edge of each card is moved from the path of the leading edge of the on-coming card. Since the screws 75 are resilient, if the leading edge of a card initially engages the outer crest of any helix, the spring will be deformed without offering substantial resistance to further longitudinal feeding of the card by the transport roll 25, and therefore, notwithstanding the fact that the card is being positively moved into engagement with the spring screws 75, no damage can occur to the card.

Referring to FIGS. 8 and 9, a modified structure is shown for initiating and maintaining frictional coengagement between the cards and the feed roll 25 and for further guiding a card into the throat 60. In this embodiment, short leaf springs 137, mounted on the feed station and wall 39, like the previously described leaf springs 36, 37 are adapted to engage the lowermost card at the feed station when the finger 35 on the plate 9 is moved downwardly to the position of FIG. 9 from the position of FIG. 8, to initiate the transport of the successive cards. A second set of springs 137a have ends connected to the stop block 40 by the fasteners 40a and free ends which contact the face 50 of the readers support 47, so that the bowed, intermediate portions of the springs 137a will exert the pressure on the cards required to transport the cards past the reader 48. With this modified construction, the main transport friction provided by the springs 137a can be established independently of the pressure of springs 137 required to initiate the transport.

In addition, in FIGS. 8 and 9, a third leaf spring or springs 160 mounted beneath the reader 48 and having a down-turned free end projecting towards the stripper fingers engage the card to constrain it to movement through the throat 60 and to maintain frictional engagement of the card with the roll 25 during the terminal stage of movement into the stacker, after the card has fully passed the reading station R.

From the foregoing, it will be apparent that the present invention provides card reading or handling apparatus which is simple in its construction, yet efficient in operation, the single feed roll and pressure applying means resulting in uniform feeding of cards to the reading station throughout the entire range of card feed rates, in uniform alignment as established at the feed station, and notwithstanding that a card may be bent or crumpled, the cards being effectively end stacked at the stacking station without damage or shut-down of the apparatus.

I claim:

1. In card handling apparatus: a feed station adapted to receive a stack of cards, card transport means including a feed roll having a cylindrical friction surface, means for feathering said cards towards said feed roll to present the leading edge of successive cards to said feed roll, drive means for continuously rotating said feed roll, pressure applying means adjacent to said feed roll for engaging the leading edge of successive cards and pressuring said cards into frictional engagement with said surface of said feed roll, feed means operable independently of said drive means normally holding the leading edge of said cards and said pressure applying means in positions at which cards are out of frictional contact with said feed roll, and means for operating said feed means to allow said pressure applying means to press said cards successively into engagement with said feed roll, said feed roll having a peripheral groove, said feed means including a plate mounted for pivotal movement on an axis transverse to said cards, said plate having a portion extending into said groove for normally holding said cards out of frictional engagement with said feed roll, said plate being operable by said operating means to move said portion of said plate into said groove to enable frictional engagement of the card adjacent to said plate with said feed roll.

2. In apparatus for handling data cards as defined in claim 1, said pressure applying means comprising a leaf spring slidably engageable with the cards within the extent of said feed roll axially of said feed roll and spaced from the bottom of said groove.

3. In apparatus for handling data cards as defined in claim 2, said leaf spring extending circumferentially of said feed roll to press said cards against said feed roll as said cards are transported by said feed roll.

4. In apparatus for handling data cards as defined in claim 2, said leaf spring extending circumferentially of said feed roll to press said cards against said feed roll as said cards are transported by said feed roll, and additional means for resiliently holding said cards against said feed roll as said cards leave said pressure applying means.

5. In apparatus for handling data cards as defined in claim 4, said additional means comprising an additional leaf spring extending circumferentially of said feed roll.

6. In card handling apparatus as defined in claim 1, a guide surface adjacent one side of said plate for aligning said cards with said feed roll.

7. In card handling apparatus as defined in claim 1, said means for feathering said cards comprising an inclined surface on said plate remote from said feed roll.

* * * * *